United States Patent
Morley et al.

(10) Patent No.: US 9,684,686 B1
(45) Date of Patent: Jun. 20, 2017

(54) DATABASE SYSTEM RECOVERY USING NON-VOLATILE SYSTEM MEMORY

(71) Applicant: Amazon Technologies, Inc., Reno, NV (US)

(72) Inventors: Adam Douglas Morley, Seattle, WA (US); Swaminathan Sivasubramanian, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 214 days.

(21) Appl. No.: 14/018,264

(22) Filed: Sep. 4, 2013

(51) Int. Cl.
  *G06F 17/30* (2006.01)
  *G06F 11/14* (2006.01)

(52) U.S. Cl.
  CPC .... *G06F 17/30371* (2013.01); *G06F 11/1469* (2013.01); *G06F 17/30312* (2013.01)

(58) Field of Classification Search
  CPC .................................................. G06F 17/30286
  See application file for complete search history.

(56) References Cited

U.S. PATENT DOCUMENTS

| | | | |
|---|---|---|---|
| 6,067,550 A * | 5/2000 | Lomet | |
| 8,397,032 B2 | 3/2013 | Elnozahy | |
| 9,251,003 B1 * | 2/2016 | Gupta | G06F 11/1469 |
| 2006/0235984 A1 * | 10/2006 | Kraus | G06F 17/24 709/228 |
| 2007/0174541 A1 * | 7/2007 | Chandrasekaran et al. | 711/100 |
| 2012/0054447 A1 | 3/2012 | Swart et al. | |
| 2012/0310985 A1 | 12/2012 | Gale et al. | |
| 2012/0310986 A1 | 12/2012 | Frantz et al. | |
| 2012/0310991 A1 | 12/2012 | Frantz et al. | |
| 2013/0282952 A1 * | 10/2013 | Miyamae | G06F 12/0884 711/102 |
| 2014/0108868 A1 * | 4/2014 | Neerincx et al. | 714/39 |
| 2015/0039573 A1 * | 2/2015 | Bhattacharjee et al. | 707/693 |

OTHER PUBLICATIONS

Yuan Xie "Emerging NVM Memory Technologies" Pennsylvania State University, 2012, downloaded Aug. 19, 2013, pp. 1-31.
Adrian Proctor "NV-DIMM: Fastest Tier in Your Storage Strategy" Viking Technology whitepaper 2012, pp. 1-7.

* cited by examiner

*Primary Examiner* — Mohammad S Rostami
(74) *Attorney, Agent, or Firm* — Robert C. Kowert; Meyertons, Hood, Kivlin, Kowert & Goetzel, P.C.

(57) ABSTRACT

A database system may implement database system recovery using non-volatile system memory. An update to a data page of a database may be received. A version of the data page may be obtained in system memory. A new version of the data page may be determined according to the received update. The new version of the data page may be maintained in a non-volatile portion of system memory irrespective of a failure of the database. In at least some embodiments, the update may be performed without generating recovery log records indicating the update. Upon recovery from a database failure, data pages maintained in non-volatile system memory may be made available to service access requests.

21 Claims, 10 Drawing Sheets

DATABASE SYSTEM RECOVERY USING NON-VOLATILE SYSTEM MEMORY

BACKGROUND

Database systems support ever growing numbers of different technologies and transactions. From traditional database systems that support established technologies used to facilitate and track sales, inventory management, or other financial transactions, to highly optimized data systems that undergird a variety of different web-based or mobile applications, database systems must increasingly provide more efficient and durable performance in order to keep up with requests from database clients. Traditionally, database systems have implemented a variety of different recovery techniques to ensure that transactions committed by the database system are durably persisted, even in the event of a system failure. However, such recovery techniques oftentimes introduce additional processing and other operational burdens. Moreover, the added complications of recovery techniques may increase the costs for administration and maintenance of database systems. For database systems that deal in a high volume of access requests, often resulting in a less forgiving environment for coping with database downtime or failure, recovery techniques that are slow to return a database system to normal operational capacity further exacerbate the effects of database system failure.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may be employed in various combinations and in various embodiments to perform database system recovery using non-volatile system memory. System memory may be implemented in a database system that includes at least a non-volatile portion of the system memory. Updates for a data page received at the database system may be made to generate a new version of the data page, which may then be stored in the non-volatile portion of the system memory. Subsequent read requests for the data page may be serviced from the new version of the data page maintained in the non-volatile portion of system memory. Upon recovery from a failure of the database system, the non-volatile portion of the system memory may be made available for servicing access requests, such as read or write requests, without applying other recovery records, such as transaction log records, to new versions of the data pages stored in the non-volatile portion of the system memory.

Figure 1:
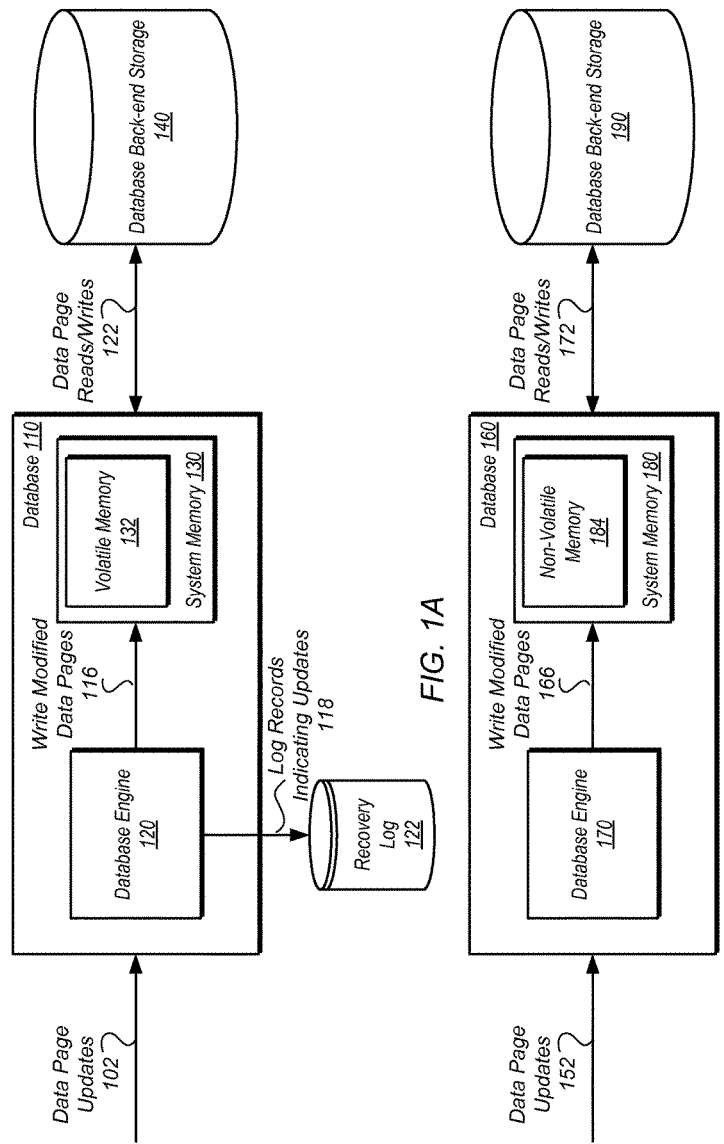
FIG. 1A is a block diagram illustrating traditional database system recovery techniques implementing transaction logging.
FIG. 1B is a block diagram illustrating a database system implementing recovery using non-volatile system memory, according to some embodiments.

Typical database systems often implement logging techniques (sometimes referred to as write-ahead logging) to recover from database system failures. For example, FIG. 1A is a block diagram illustrating traditional database system recovery techniques implementing transaction logging. A database system 110 that maintains data for a database may implement a database engine 120. Database engine 120 may be a component, module, or device that is configured to process access requests and manage the data. Database back-end storage 140 may be one or more persistent storage devices (e.g., hard disk storage devices) that maintain the data for the database in data blocks or allocation units, such as data pages. When a data page update 102 is received, such as a write request to a particular data page, it is common for one or more log records indicating the update 118 (such as redo, undo, transaction table entries, etc.) to be sent to a persistent recovery log 122. Thus, in the event of a failure of database 110, log records in the recovery log 122 may be applied or used to generate data pages for received data page updates 102, even if the data pages modified by the data page updates 102 have yet to be stored in database back-end storage 140.

Recovery log 122 is typically implemented on one or more persistent storage devices, and thus the operational cost to write the log records indicating updates 118 is subject to the usual speeds and characteristics of such persistent storage devices, which are generally significantly slower than other storage technologies, such as random access memory. Moreover, upon occurrence of a database system failure, a complicated process of re-applying and then undoing data page updates 102 may be performed in order for database 110 to provide a consistent state of the database 110.

In addition to writing log records indicating updates 118 to recovery log 122, database engine 120 may obtain a version of the modified data page, such as from a cached version of the page in volatile memory 132, in system memory 130. The data page update 102 may then be applied, and the modified data page 116 may be written back to volatile memory 132. For those versions of data pages that are not available in system memory 130, data page reads 122 may be issued to database back-end storage 140 in order to obtain the data page.

After a certain period of time, modified data pages 116 may be flushed 122 (i.e. written) from system memory 130 into database back-end storage 140. However, as modified data pages 116 are maintained in volatile system 132, those modified data pages 116 not yet flushed to disk are only recoverable by relying on log records indicating the updates 118 in the recovery log 122.

In contrast with the database system illustrated in FIG. 1A, FIG. 1B is a block diagram illustrating a database system implementing recovery using system memory that includes at least a portion of non-volatile memory, according to some embodiments. Data page updates 152 may be received at database 160. Database engine 170 may be configured to process data page updates 152. In at least some embodiments, database engine 170 may be configured to apply each update received at the database system atomically (i.e. is either the update is applied or not applied). In order to perform the update 152 to the data page, database engine 170 may obtain a version of the data page in system memory 180. For instance, for a data page not maintained in system memory 180, the data page may be read 172 from database back-end storage 190. Although not illustrated in FIG. 1B, in some embodiments, system memory 180 may implement a portion of volatile memory that may operate as a database cache, which may maintain a version of the data page to be updated. The volatile portion of system memory 180 may also be used for performing various operations (e.g., modifying index structures, data dictionaries, calculations, etc.) to determine a new version of the data page according to the received update 152. However, in at least some embodiments, non-volatile memory 184 may be used to perform the various operations for determining a new version of the data page that is to be updated according to the received update 152.

The modified data pages may then be written 166 to the non-volatile portion 184 of system memory 180. As non-volatile memory 184 may maintain the modified data pages 166 irrespective of a system failure, in some embodiments, database system 160 may make the modified data pages 166 available for servicing read requests. These data pages may be made available, in some embodiments, without applying log or other recovery records, to generate the modified data pages 166. For some of those embodiments implementing a volatile portion of system memory 180, after a modified data page 166 that has been written to non-volatile memory 184, a copy or version of the data page maintained in the volatile portion of system memory 180 (e.g., in database cache) may be invalidated, such that subsequent read or write requests for the data page are serviced from the new version of the page maintained in non-volatile memory 184.

Modified data pages 166 may, at various times, be flushed 172 (written, sent, or provided) to database back-end storage 190 to be persisted. In some embodiments, modified data pages 166 may be flushed 172 in response to detecting a flush event, such as a database checkpoint, in response to a request from a component, module, or process (e.g., a non-volatile memory manager implementing a least recently used (LRU) algorithm). Flushing data pages 172 may be performed as part of a background process, making system resources available for foreground processing (such as processing read and write requests).

The specification first describes an example database system, a network-based distributed storage service, configured to perform database system recovery using non-volatile system memory. Included in the description of the example network-based database service are various aspects of the example network-based storage service, such as administrative and separate storage node instances. The specification then describes flowcharts of various embodiments of methods for performing recovery using non-volatile system memory in a database system. Next, the specification describes an example system that may implement the disclosed techniques. Various examples are provided throughout the specification.

Figure 2:
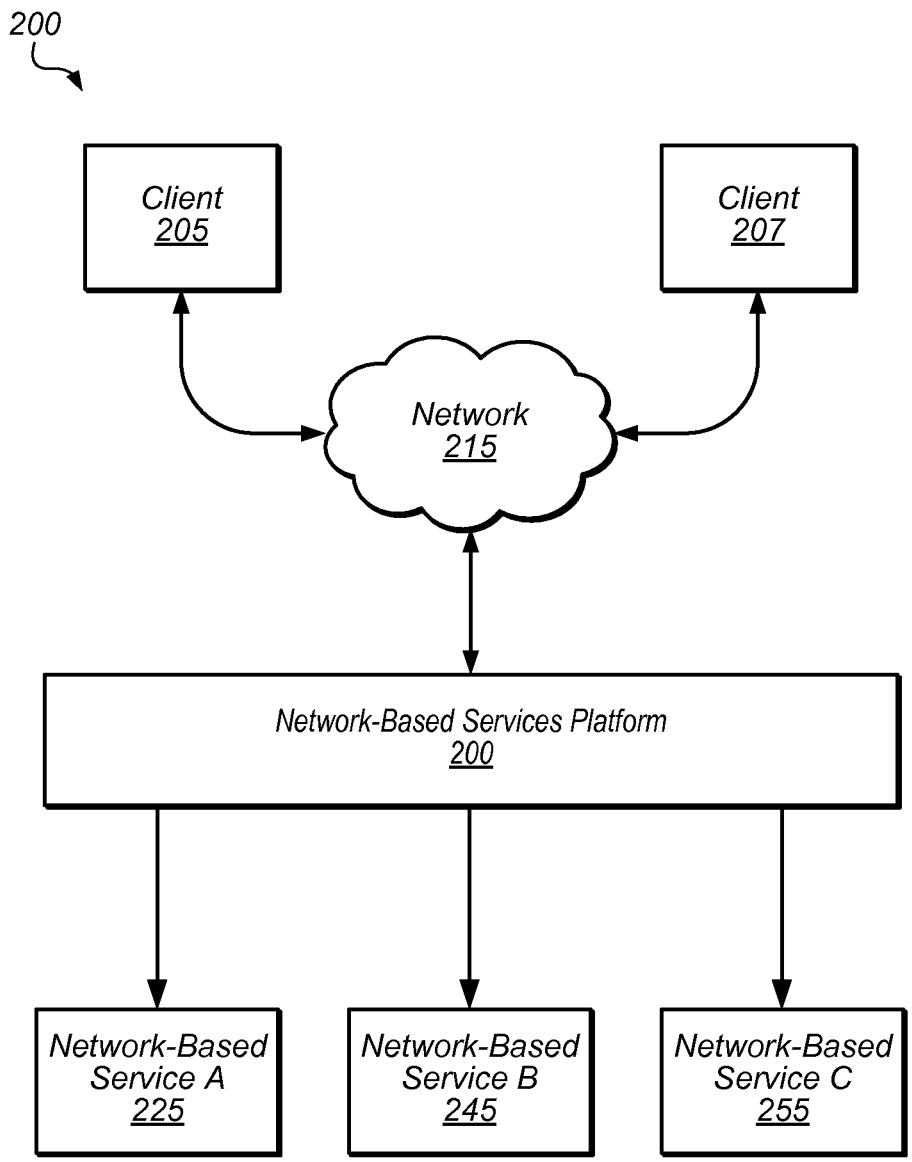
FIG. 2 is a block diagram illustrating an example operating environment for network-based services, according to some embodiments.

Various techniques described herein may be employed in local or remote computing systems, including systems that provide services to users (e.g., subscribers) over the Internet or over other public or private networks, such as virtual private networks and connections to services in a virtual private cloud (VPC) environment. FIG. 2 illustrates a block diagram of a system that provides various network-based services to clients, according to one embodiment. In this example, system 200 includes one or more clients 205. In this example, the client's 205 may be configured to interact with a network-based services platform 200 via a communication network 215.

As illustrated in this example, the network-based services platform 200 may be configured to process requests from clients 205 for various services, such as network-based service A (225), network-based service B (245), and network-based service C (255), and to return results to the clients 205. Network-based services platform 200 may also perform various accounting, metering, billing, or other administrative functions for the offered network-based services, such as logging client use of each service and generating a corresponding charger for an account associated with a particular customer. Each of the network-based services may provide clients with one or more of: computational resources, database services, data storage services (e.g., maintaining data in one or more tables on behalf of a client), or any other types of services or shared resources.

Figure 3:
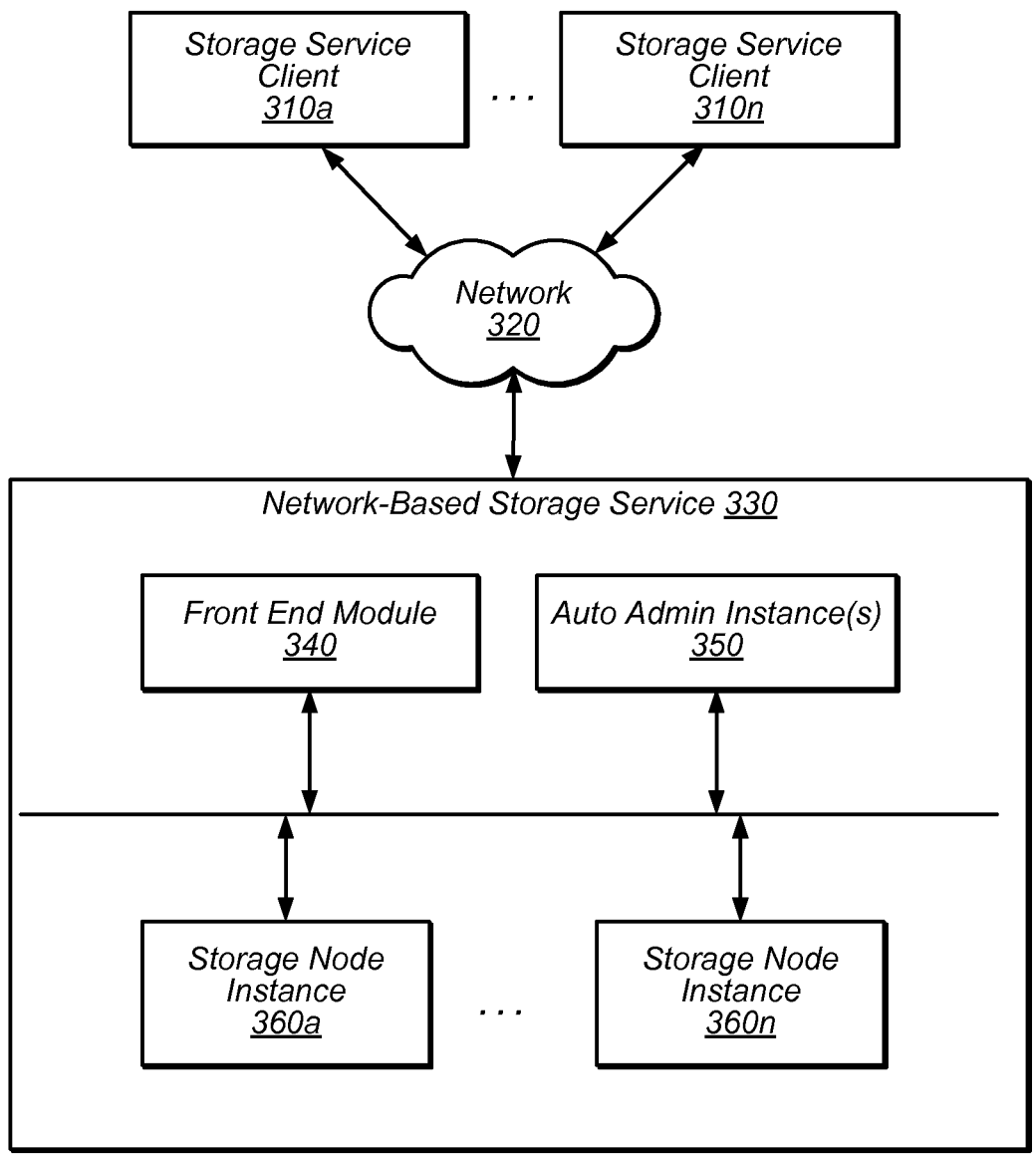
FIG. 3 is a block diagram illustrating a network-based storage service, according to some embodiments.

One embodiment of a system architecture that is configured to implement a network-based distributed storage service such as that described herein is illustrated in FIG. 3. It is noted that where one or more instances of a given component may exist, reference to that component herein below may be made in either the singular or the plural. However, usage of either form is not intended to preclude the other. In various embodiments, the components illustrated in FIG. 3 may be implemented directly within computer hardware, as instructions directly or indirectly executable by computer hardware (e.g., a microprocessor or computer system), or using a combination of these techniques. For example, the components of FIG. 3 may be implemented by a distributed system including a number of computing nodes (or simply, nodes), such as computing system 1000 in FIG. 10 described below. In various embodiments, the functionality of a given storage service system component may be implemented by a particular computing node or may be distributed across several computing nodes.

In some embodiments, a given computing node may implement the functionality of more than one storage service system component.

Generally speaking, storage service clients 310a-310n may encompass any type of client configurable to submit network-based services requests to network-based services platform 330 via network 320. For example, a given storage service client 310 may include a suitable version of a web browser, or a plug-in module or other type of code module configured to execute as an extension to or within an execution environment provided by a web browser to provide database or data storage service clients (e.g., client applications, users, and/or subscribers) access to the services provided by network-based services platform 330. Alternatively, a storage service client 310 may encompass an application such as a database application, media application, office application or any other application that may make use of persistent storage resources. In some embodiments, such an application may include sufficient protocol support (e.g., for a suitable version of Hypertext Transfer Protocol (HTTP)) for generating and processing network-based services requests without necessarily implementing full browser support for all types of web-based data. That is, storage service client 310 may be an application configured to interact directly with network-based services platform 330. In various embodiments, storage service client 310 may be configured to generate network-based services requests according to a Representational State Transfer (REST)-style web services architecture, a document or message-based web services architecture, or another suitable network-based services architecture.

In some embodiments, storage service client 310 may be configured to provide access to network-based services-based storage to other applications in a manner that is transparent to those applications. For example, storage service client 310 may be configured to integrate with an operating system or file system to provide storage in accordance with a suitable variant of the storage model described herein. However, the operating system or file system may present a different storage interface to applications, such as a conventional file system hierarchy of files, directories and/or folders. In such an embodiment, applications may not need to be modified to make use of the storage system service model described herein. Instead, the details of interfacing to network-based services platform 330 may be coordinated by storage service client 310 and the operating system or file system on behalf of applications executing within the operating system environment.

Storage service clients 310 may convey network-based services requests to and receive responses from network-based storage service 330 via network 320. In various embodiments, network 320 may encompass any suitable combination of networking hardware and protocols necessary to establish web-based communications between clients 310 and network-based storage service 330. For example, network 320 may generally encompass the various telecommunications networks and service providers that collectively implement the Internet. Network 320 may also include private networks such as local area networks (LANs) or wide area networks (WANs) as well as public or private wireless networks. For example, both a given client 310 and network-based storage service 330 may be respectively provisioned within enterprises having their own internal networks. In such an embodiment, network 320 may include the hardware (e.g., modems, routers, switches, load balancers, proxy servers, etc.) and software (e.g., protocol stacks, accounting software, firewall/security software, etc.) necessary to establish a networking link between given client 310 and the Internet as well as between the Internet and network-based storage service 330. It is noted that in some embodiments, storage service clients 310 may communicate with network-based storage service 330 using a private network rather than the public Internet. For example, clients 310 may be provisioned within the same enterprise as the data storage service (and/or the underlying system) described herein. In such a case, clients 310 may communicate with platform 330 entirely through a private network 320 (e.g., a LAN or WAN that may use Internet-based communication protocols but which is not publicly accessible).

Generally speaking, network-based storage service 330 may be configured to implement one or more service endpoints configured to receive and process web services requests, such as requests to access tables maintained on behalf of clients/users by a database service or a data storage service, and/or the items and attributes stored in those tables. For example, network-based storage service 330 may include hardware and/or software configured to implement various service endpoints and to properly receive and process HTTP-based web services requests directed to those endpoints. In one embodiment, network-based storage service 330 may be implemented as a server system configured to receive web services requests from clients 310 and to forward them to various components that collectively implement a data storage system for processing. In other embodiments, network-based storage service 330 may be configured as a number of distinct systems (e.g., in a cluster topology) implementing load balancing and other request management features configured to dynamically manage large-scale web services request processing loads.

As illustrated in FIG. 3, network-based storage service 330 may include a front end module 340 (which may be configured to receive, authenticate, parse, throttle and/or dispatch service requests, among other things), one or more administrative components, or auto admin instances, 350 (which may be configured to provide a variety of visibility and/or control functions, as described in more detail herein), and a plurality of storage node instances (shown as 360a-360n), each of which may maintain and manage one or more tables on behalf of clients/users or on behalf of the data storage service (and its underlying system) itself. Some of the functionality provided by each of these types of components is described in more detail herein, according to various embodiments. Note that in some embodiments, network-based storage service 330 may include different versions of some of the components illustrated in FIG. 3 to provide functionality for creating, accessing, and/or managing tables maintained in database instances within a single-tenant environment than those that provide functionality for creating, accessing, and/or managing tables maintained in database instances within a multi-tenant environment. In other embodiments, functionality to support both multi-tenant and single-tenant environments may be included in any or all of the components illustrated in FIG. 3. Note also that in various embodiments, one or more database instances may be implemented on each of the storage nodes 360a-360n, and each may store tables on behalf of clients. Some of these database instances may operate as if they were in a multi-tenant environment, and others may operate as if they were in a single-tenant environment. In some embodiments, database instances that operate as in a multi-tenant environment may be implemented on different computing nodes (or on different virtual machines executing on a single computing node) than database instances that operate as in a single-tenant environment.

In various embodiments, network-based storage service 330 may be configured to support different types of network-based services requests. For example, in some embodiments, network-based storage service 330 may be configured to implement a particular web services application programming interface (API) that supports a variety of operations on tables that are maintained and managed on behalf of clients/users by the data storage service system (and/or data stored in those tables). Examples of the operations supported by such an API are described in more detail herein.

In addition to functioning as an addressable endpoint for clients' web services requests, in some embodiments, network-based storage service 330 may implement various client management features. For example, platform 330 may coordinate the metering and accounting of client usage of web services, including storage resources, such as by tracking the identities of requesting clients 310, the number and/or frequency of client requests, the size of tables and/or items stored or retrieved on behalf of clients 310, overall storage bandwidth used by clients 310, class of storage requested by clients 310, and/or any other measurable client usage parameter. Network-based storage service 330 may also implement financial accounting and billing systems, or may maintain a database of usage data that may be queried and processed by external systems for reporting and billing of client usage activity. In some embodiments, network-based storage service 330 may include a lock manager and/or a bootstrap configuration (not shown).

In various embodiments, the data storage service described herein may provide an application programming interface (API) that includes support for some or all of the following operations on the data in a table maintained by the service on behalf of a storage service client: put (or store) an item, get (or retrieve) one or more items having a specified primary key, delete an item, update the attributes in a single item, query for items using an index, and scan (e.g., list items) over the whole table, optionally filtering the items returned. The amount of work required to satisfy service requests that specify these operations may vary depending on the particular operation specified and/or the amount of data that is accessed and/or transferred between the storage system and the client in order to satisfy the request.

In some embodiments, the service (and/or the underlying system that implements the service) may support a strong consistency model, in addition to supporting eventually consistent read operations. In some embodiments, service requests made via the API may include an indication of one or more user preferences, such as a preferred consistency model, a preferred service request throughput level, or a service request throughput level for which a guarantee is requested. In other embodiments, some or all of these user preferences may be specified when a table is created, or may be client-specific, account-specific, specific to various table types, or specified by system-wide default values, rather than being specified on a per-request basis. The API may support extreme scaling and/or more predictable performance than that provided by prior data storage systems and services.

In some embodiments, a partition replica may be assigned to a particular storage node based largely (or solely) on whether there is enough storage capacity for the anticipated size of the table. For example, the anticipated size may be based on information included in a request to create the table, on usage history for the client on whose behalf the table was created, or on a history of accesses that target the table, the partition, or the replica itself (e.g., if this is a partition replica that is being reassigned as part of a move operation). In such embodiments, there may or may not be enough throughput capacity for the partition replica on the selected storage node (or storage device thereof). For example, a disk to which the partition replica is assigned may be oversubscribed in terms of IOPS, the actual number of IOPS may be more than was expected, or the provisioned (or committed) number of IOPS may have grown after the partition replica was created (e.g., using an UpdateTable operation to increase the provisioned throughput capacity for read operations and/or write operations). In some embodiments, an UpdateTable operation may be invoked by a client through a graphical user interface (GUI). In other embodiments, an UpdateTable operation may be invoked through an UpdateTable API whose inputs include an identifier of the table for which additional throughput capacity is desired, a desired (e.g., increased) number of IOPS for read operations and/or a desired (e.g., increased) number of IOPS for write operations. In some or all of these cases, the partition replica may need to be moved to another storage node (or storage device) or split into two new (smaller) partitions, each of which may be hosted on a different storage device (or storage node).

In various embodiments, a database service or data storage service may be implemented on one or more computing nodes that are configured to perform the functionality described herein. In some embodiments, the service may be implemented by a network-based storage service (such as network-based storage service 330 in FIG. 3) that is made up of multiple computing nodes, each of which may perform one or more of the functions described herein. Various collections of the computing nodes may be configured to provide the functionality of an auto-admin cluster, a cluster of resources dedicated to the data storage service, and a collection of external resources (which may be shared with other network-based services or applications, in some embodiments).

In some embodiments, the database systems described herein may support seamless scaling of user tables in a "fully shared nothing" type architecture. For example, in some embodiments, each database partition may be implemented as a completely independent parallel computation unit. In such embodiments, the system may not provide distributed coordination across partitions or support batch "put" operations and/or multi-statement transactions. In some embodiments, as long as the workload distribution is well spread across partitions, an increase in the number of partitions may result in a larger usable table size and/or increased throughput capacity for service requests. As described herein, in some embodiments, live repartitioning (whether programmatic/automatic or explicitly initiated) may be employed to adapt to workload changes. In other words, in some embodiments, repartitioning (including partition moving, partition splitting, and/or other partition management operations) may be performed while service requests directed to the affected partitions continue to be received and processed (i.e. without taking the source partition off-line).

In some embodiments, a service (and/or underlying system) may support a variety of service offerings and/or throughput models. In some embodiments, the service may support a committed work throughput offering and/or a best effort offering. In some embodiments, a committed work throughput level may be specified in terms of a measure of normalized, logical work units (or logical service request units) over time, and may represent a work throughput level that is guaranteed by the system. For example, in systems that provide database or data storage services (e.g., in tables maintained on behalf of clients), a storage service client (e.g., a client application, user, or subscriber having access to the service) may specify a preference between multiple throughput options that are offered by the service, according to a variety of business models, subscription types, and/or payment models. For example, the client/user may indicate a preferred throughput model for a particular table through a parameter of a request to create the table, in some embodiments. In other embodiments, a client/user may specify a default throughput model for all tables created and maintained on their behalf by the data storage service. By supporting both a committed throughput model and a best effort throughput model (for which no throughput guarantees are made), the system may allow clients/users to make a trade-off between performance and cost, according to their needs and/or budgets. Other types of services may support a committed work throughput model and/or other throughput models.

A data storage service (and underlying system) that provides a committed throughput offering may be configured to pre-allocate capacity and/or resources for the creation, growth, and management of a table maintained on behalf of a client/user in response to traffic directed to the table, and not to overbook the resources and/or capacity of the storage node(s) on which that table is maintained. In some embodiments, tables maintained by the service (and underlying system) under a committed throughput model may be maintained in faster (and often more expensive) storage resources, such as high performance media (e.g., flash memory or Solid State Drive, or SSD, media), in order to provide extremely low latencies when servicing requests from the client/user. For example, the system may provide (and dedicate) a high ratio of fast/local memory to main (e.g., disk) memory for the maintenance of those tables (and various partitions thereof). While the storage resources allocated to a given table under a committed throughput model may in some cases be underutilized (at least some of the time), the client/user may value the predictable performance afforded by the committed throughput model more than the additional (and in some cases wasted) costs of dedicating more resources than may always be necessary for that table. Similarly, resources that are pre-allocated to other types of services to support a committed work throughput model may in some cases be underutilized (at least some of the time), but may provide the client/user with a predictable level of performance (e.g., in terms of availability and/or responsiveness).

As described herein, in some embodiments the systems described herein may support both a multi-tenant model and a single-tenant model. In such some embodiments, the client/user may indicate a preferred one of these tenancy models for a particular table through a parameter of a request to create the table. In other embodiments, a client/user may specify a default or initial tenancy model for all tables created and maintained on their behalf by the data storage service.

Figure 4A:
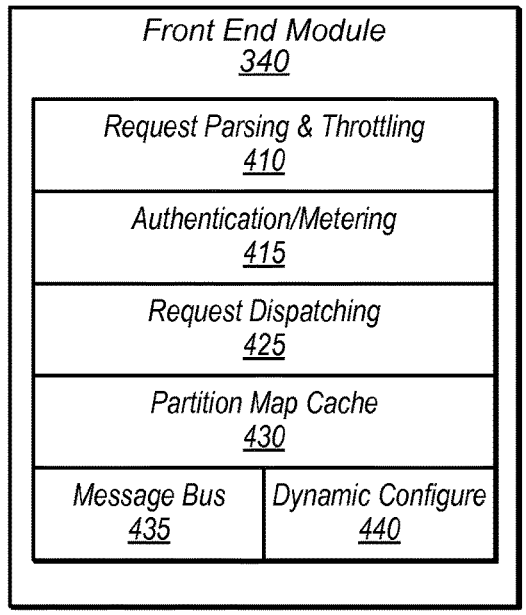
FIGS. 4A-4C are block diagrams illustrating various components of a network-based storage service, according to some embodiments.
Figure 4B:
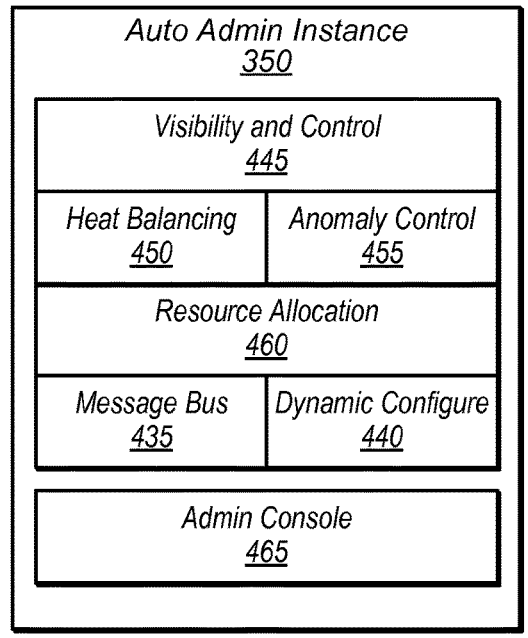
Figure 4C:
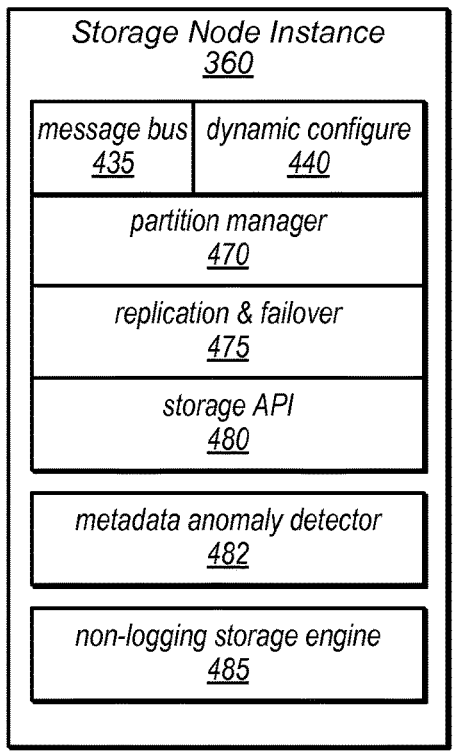

FIGS. 4A-4C illustrate various elements or modules that may be included in each of the types of components of network-based storage service 330, according to one embodiment. As illustrated in FIG. 4A, front end module 340 may include one or more modules configured to perform parsing and/or throttling of service requests (shown as 410), authentication and/or metering of service requests (shown as 415), dispatching service requests (shown as 425), and/or maintaining a partition map cache (shown as 430). In addition to these component-specific modules, front end module 340 may include components that are common to multiple types of computing nodes that collectively implement network-based storage service 330, such as a message bus (shown as 435) and/or a dynamic configuration module (shown as 440). In other embodiments, more, fewer, or different elements may be included in front end module 340, or any of the elements illustrated as being included in front end module 340 may be included in another component of network-based storage service 330 or in a component configured to interact with network-based storage service 330 to provide the data storage services described herein.

As illustrated in FIG. 4B, auto admin instance 350 may include one or more modules configured to provide visibility and control to system administrators (shown as 445), or to perform heat balancing (shown as 450), and/or anomaly control (shown as 455), resource allocation (shown as 460). In some embodiments, resource allocation module 460, heat balancing module 450, and/or anomaly control module 455 may be configured to work separately or in combination to perform selection, ordering, or scheduling of candidate partition management operations (e.g., various partition splitting operations or partition moving operations), as described in more detail below. Auto admin instance 350 may also include an admin console 465, through which system administrators may interact with the data storage service (and/or the underlying system). In some embodiments, admin console 465 may be the primary point of visibility and control for the data storage service (e.g., for configuration or reconfiguration by system administrators). For example, admin console 465 may be implemented as a relatively thin client that provides display and control functionally to system administrators and/or other privileged users, and through which system status indicators, metadata, and/or operating parameters may be observed and/or updated.

In addition to these component-specific modules, auto admin instance 350 may also include components that are common to the different types of computing nodes that collectively network-based storage service 330, such as a message bus (shown as 435) and/or a dynamic configuration module (shown as 440). In other embodiments, more, fewer, or different elements may be included in auto admin instance 350, or any of the elements illustrated as being included in auto admin instance 350 may be included in another component of network-based storage service 330 or in a component configured to interact with network-based storage service 330 to provide the data storage services described herein.

As illustrated in FIG. 4C, storage node instance 360 may include one or more modules configured to provide partition management (shown as 470), to implement replication and failover processes (shown as 475), and/or to provide an application programming interface (API) to underlying storage (shown as 480). In some embodiments, the partition manager 470 (or another component of storage node instance 360) may be configured to identify candidate partition management operations to be performed locally (e.g., on a given storage node instance 360) based, e.g., on one or more measures of the utilization of provisioned resources on the storage devices or logical storage volumes of the storage node instance. Partition manager 470 may also perform various ones of the methods and techniques discussed below to detect and reconcile system resource metadata anomalies for partitions, in some embodiments.

Figure 5:
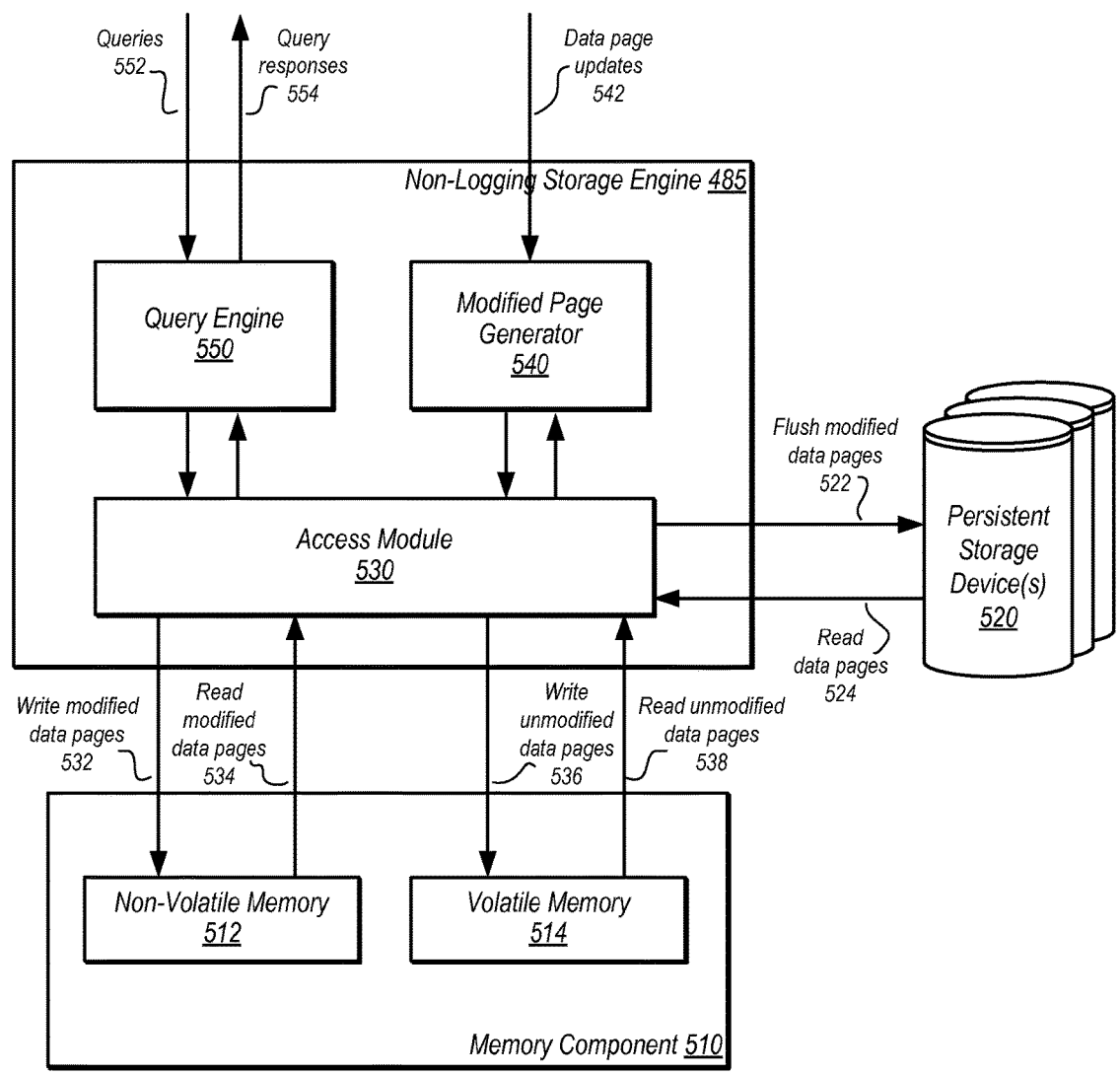
FIG. 5 is a block diagram illustrating a non-logging storage engine for database system recovery using non-volatile system memory, according to some embodiments.

As illustrated in this example, each storage node instance 360 may include a non-logging storage engine 485, which may be configured to maintain (i.e. to store and manage) one or more tables (and associated table data) in storage 480 (which in some embodiments may be a non-relational database) on behalf of one or more clients/users. Non-logging storage engine 485 may, in various embodiments, be configured to implement database system recovery using non-volatile system memory. FIG. 5 is a block diagram illustrating a non-logging storage engine for database system recovery using non-volatile system memory, according to some embodiments.

Non-logging storage engine 485 may, in various embodiments, process various access requests for data maintained at storage node 360. Non-logging storage engine 485 may have access to persistent storage device(s) 520 which may persistently store data for the storage node 360. Persistent storage device(s) 520 may be any type of block-based or other persistent storage, such as different kinds of mechanical (e.g., hard disk drive) or non-mechanical (solid-state drive) persistent storage devices, that may persist data for a database system, such as network-based storage service 330.

Non-logging storage engine 485 may, in some embodiments, have access to system memory, such as memory 1020 described below with regard to FIG. 10, which is illustrated as memory component 510 in FIG. 5. In at least some embodiments, memory component 510 may implement a portion of system memory as non-volatile memory 512. Non-volatile memory 512 may be implemented using a variety of different non-volatile memory technologies that provide similar or near conventional system memory performance characteristics. Various examples of non-volatile memory technology are given below, and are not intended to be limiting. In some embodiments, Ferroelectric RAM may be used as non-volatile storage memory 512. Generally, ferroelectric RAM may implement a ferroelectric layer in order to store data in storage elements (e.g., storage cells). In some embodiments, MRAM may be used as non-volatile memory 512. Generally, MRAM may implement ferromagnetic plates to store data in storage elements. In some embodiments, resistive random access memory may be used as non-volatile memory 512. Resistive random access memory may generally implement resistive memory cells, which can conduct through a dielectric, switching between high or low resistance. In some embodiments, phase-change random access memory may be used to implement non-volatile system memory 512. Generally, phase-change random access memory implements chalcogenide glass in low resistance and high resistance states. In some embodiments, non-volatile random access memory (NV-RAM) or some other form of battery-backed memory device may be implemented as non-volatile memory 512. Battery-backed memory devices (e.g., NV-DIMMs) may transfer data from a volatile memory component to flash-based storage in order to maintain data stored in the volatile memory component irrespective of a system failure.

In some embodiments, memory component 510 may also implement a portion of system memory as volatile memory 514. Such an implementation may be made for a variety of different reasons. In some embodiments, for example, non-volatile memory 512 may perform at a slight slower level of efficiency (e.g., speed) for certain operations, such as read operations. Therefore, a faster volatile memory 514 component may also be implemented to service read requests, such as by maintaining a database cache. Volatile memory 514 may be implemented using a variety of different volatile memory technologies. For example, in some embodiments, volatile memory 514 may be implemented as dynamic random access memory (DRAM), or static random access memory (SRAM), as well as countless varieties of these and other random access memory technologies, including, but not limited to dual in-line memory module (DIMM), synchronous dynamic random access memory (SDRAM), or double data rate synchronous random access memory (DDR-SDRAM).

Non-logging storage engine 485 may also implement access module 530, in some embodiments. Access module 530 may be one or more components or devices configured to communicate with persistent storage device(s) 520 and memory component 510 (including non-volatile memory 512 and/or volatile memory 514). In some embodiments, different access modules 530 may be implemented to access persistent storage device(s) 520 and memory component 510 respectively. Access module 530 may interact with an operating system kernel or other component (e.g., library) that is configured to interface with persistent storage devices 520 and memory component 510. For instance, access module 530 may be configured to issue one or more system calls in order to perform the various read and write requests illustrated in FIG. 5.

In at least some embodiments, access module 530, modified page generator 540, or some other component or module of non-logging storage engine 485 may be configured to allow portions of non-volatile memory 512 to be treated as block addressable, in a manner similar to a block-based storage device. In this way, torn writes (writes where the portion of data in memory being modified is not completely written) may be prevented. For example access module 530 may write modified data pages first into volatile memory 514, then into non-volatile memory 512, but not switch a pointer or other indicator directing read requests to the updated data page in non-volatile memory 512 until the write has been completed. In some embodiments, a similar technique may be implemented in order to prevent read accesses from being serviced by an indexing structure, such as a b-tree, when that index is being modified. If, for example, an update to a data page causes modifications to be made to pages in a b-tree index for the database, then the changes may be made to all of the affected node pages in non-volatile portion of memory before a pointer or other indicator/mapping information will direct read requests to be serviced from the non-volatile portion of memory.

In various embodiments, non-logging storage engine 485 may be configured to receive data page updates 542 and queries 552 for data pages. Non-logging storage engine 485 may also implement a modified page generator 540 and a query engine 550 in order to processes these requests respectively. Modified page generator 540 may be configured to receive data page updates 542. Data page updates 542 may be received as part of the various API calls described in further detail below. Generally, data page updates 542 may direct that a data page maintained at storage node instance 360 be modified in some way (e.g., adding a new value, replacing a value, operating on a value, etc. . . . ). Modified page generator 540 may be configured to obtain a version of the data page in system memory. For instance, modified page generator 540 may via access module 530 read a data page 524 from persistent storage device(s) 520 into memory component 510. For instance, unmodified data pages (those data pages read from persistent storage device(s) 520) may be written 536 to volatile memory 514 in system memory. When processing an update for data page, the unmodified data page may be read 538 from volatile memory 514 in order to perform the update.

Modified page generator 540 may, in various embodiments, be configured to determine or calculate a new version of the data page according to the received update 542. For instance, if the received data page update 542 writes an additional value to the data page, then various operations to update database system metadata describing the database (e.g., changes to database dictionary), and modify an indexing structure may be performed, in addition to calculating the data values to be stored in the data page. Each update received at modified page generator 540 may, in some embodiments, be performed atomically. In some embodiments modified page generator may rely upon non-volatile memory 512 and/or volatile memory 514 as a scratch-pad area while the new version of the data page is calculated. The determined modified data page (i.e. new version of the data page) may then be, in some embodiments, written to non-volatile memory 512.

Query engine 550 may be implemented as part of non-logging storage engine 485 in order process queries 552 (e.g., read requests) for data pages received at non-logging storage engine 485, in various embodiments. Query engine 550 may be configured to determine based on the received query 552 the data page to be read in order to service the query and provide the query response 554 including the requested data. Query engine 550, for example, may be configured to resolve the various attributes included in queries 552 (e.g., table names, column names, or various other database elements) in order to identify the data page or pages to be read in order to service the query. Query engine 550 via access module 530 may read modified data pages from non-volatile memory 512. In some embodiments, query engine 550 may be directed to read data pages from non-volatile memory 512 due to a cache invalidation, pointer, or other indication that a data page may not be present or current in volatile memory 514. Query engine 550 may also read unmodified data pages 538 via access module 530. For those data pages not found in memory component 510, query engine 550 via access module 530 may read data pages 524 into system memory component 510, either into volatile memory 514 (as illustrated), or into non-volatile memory (not illustrated), or both volatile memory 514 and non-volatile memory 512 (not illustrated).

Non-logging storage engine 485 may be configured, in some embodiments, to flush (i.e. write/send) modified data pages 522 to from non-volatile memory 512 to persistent storage device(s) 520. Flushing modified data pages from non-volatile memory 512 to persistent storage device(s) 520 may be performed in response to detecting a flush event, such as described below with regard to FIG. 9. For example, in some embodiments, a flush event may be detected when available space for storing data in the non-volatile portion of system memory falls below an available memory threshold.

Upon recovery from a system (or database) failure, non-logging storage engine 485 may begin processing both data page updates 542 and queries for data pages 552 by making non-volatile memory 512 available for servicing access requests. In this way, non-logging storage engine 485 may be able to avoid downtime associated with recovery, as modified data pages that are not yet flushed to persistent storage devices 520 are also available in the non-volatile memory 512 for servicing requests without the need to apply recovery log records to generate the current versions of the data pages.

In at least some embodiments, volatile memory 514 may implement a database cache. A database cache may maintain versions or copies of recently accessed data pages in order to service queries 552 or to perform data page updates 542 without having to read data pages 524 from persistent storage devices 520. Many different cache designs or schemas may be implemented in order to determine the data pages to be maintained in the data page cache. For example, in some embodiments, a database cache manager module or component (not illustrated) may enforce one or more cache policies. If, for instance, cached data pages have been modified in response to a data page update 542, the cache entry for the respective version/copy of the data page maintained in the database cache may be invalidated for subsequent read or write requests. In some embodiments, a database cache manager, or some other component of non-logging storage engine may determine that a number of read requests for a particular data page maintained in the database cache exceeds a hot page threshold. In response, a copy of the cached version of the data page may be written to non-volatile memory 512. In the event of a system failure, the hot data page may be available for servicing read requests from non-volatile memory 512 without having to read the data page again from persistent storage devices 520. An index, indicator, or some other manifest of versions of data pages maintained in a volatile portion of system memory may, in various embodiments, be stored in the non-volatile portion of system memory. Thus a database cache may be kept warm (containing page versions for servicing read requests) even in the event of a power/system failure that may cause data stored in the volatile portion of system memory, such as the database cache to be lost. Other cache policies may direct that servicing read requests, whether for modified data pages or unmodified data pages be serviced from the database cache, so that modified data pages may be written 532 volatile memory 514 in addition to non-volatile memory 512.

In at least some embodiments, a database cache implemented in volatile memory 514 may be utilized to implement read isolation for a group of data page updates 542. Multiple data page updates 542 may be received that are a transaction. In order to provide read isolation (i.e. not expose any of the data pages modified by the updates that are part of the transaction to read requests until all of the updates are complete), modified page generator 540 may be configured to determine the new versions of the data pages updated by the updates associated with the transaction. The modified data pages may then be written to non-volatile memory 512. However, until all of the modified data pages are written to non-volatile memory 512, read requests for the data pages updated by the transaction may be serviced by non-modified versions of the page in volatile memory 514. Once the all of the modified pages are written to non-volatile memory 512, the cache entries for the data pages associated with the transaction may then be invalidated in volatile memory 514, such that subsequent read requests for the data pages associated with the transaction are serviced from the modified versions of the data page in non-volatile memory 512.

Please note that FIG. 5 is not exhaustive, nor intended to be limiting, as to the various other interactions and/or arrangements of the illustrated components of FIG. 5 or components not illustrated may have with regard to performing database system recovery using non-volatile memory. For example, although illustrated in FIG. 5 as having a non-volatile memory portion 512, and a volatile memory portion 514, in some embodiments, memory component 510 may consist entirely of one or more non-volatile memory technologies. Therefore writes of unmodified data pages 536 and reads of unmodified data pages 538 may be directed to non-volatile memory 512. Alternatively, if, for example, volatile memory 514 responds to read requests more efficiently than non-volatile memory 512, modified data pages 532 may be written to both non-volatile memory 512 (so that it is persisted in the event of a system failure)

and volatile memory 514. Read requests for modified data pages 534 may be instead serviced from volatile memory 514.

In addition to these component-specific modules illustrated in FIGS. 4 and 5, storage node instance 360 may include components that are common to the different types of computing nodes that collectively implement network-based storage service 330, such as a message bus (shown as 435) and/or a dynamic configuration module (shown as 440). In other embodiments, more, fewer, or different elements may be included in storage node instance 360, or any of the elements illustrated as being included in storage node instance 360 may be included in another component of network-based storage service 330 or in a component configured to interact with network-based storage service 330 to provide the data storage services described herein.

Note that in some embodiments, it may not be necessary to perform some or all of the throttling, authentication, and/or metering operations that would typically be provided by front end module 340 in multi-tenant environments for tables operating in a single-tenant environment. For example, the system may be configured to elide these operations when servicing requests directed to tables in a single-tenant environment, but to perform them when servicing requests directed to tables in a multi-tenant environment. Similarly, in some embodiments, some of the operations illustrated as being performed by auto admin instance 350 (e.g., heat balancing and/or resource allocation) may or may not be applied in managing tables in a single-tenant environment. However, other operations illustrated as being performed by auto admin instance 350 (or various modules thereof) may be applied in the creation and/or management of tables in both multi-tenant and single-tenant environments.

The systems underlying the data storage service described herein may store data on behalf of storage service clients (e.g., client applications, users, and/or subscribers) in tables containing items that have one or more attributes. In some embodiments, the data storage service may present clients/ users with a data model in which each table maintained on behalf of a client/user contains one or more items, and each item includes a collection of attributes. The attributes of an item may be a collection of name-value pairs, in any order. In some embodiments, each attribute in an item may have a name, a type, and a value. Some attributes may be single valued, such that the attribute name is mapped to a single value, while others may be multi-valued, such that the attribute name is mapped to two or more values. In some embodiments, the name of an attribute may always be a string, but its value may be a string, number, string set, or number set. The following are all examples of attributes: "ImageID"=1, "Title"="flower", "Tags"={"flower", "jasmine", "white"}, "Ratings"={3, 4, 2}. The items may be managed by assigning each item a primary key value (which may include one or more attribute values), and this primary key value may also be used to uniquely identify the item. In some embodiments, a large number of attributes may be defined across the items in a table, but each item may contain a sparse set of these attributes (with the particular attributes specified for one item being unrelated to the attributes of another item in the same table), and all of the attributes may be optional except for the primary key attribute(s). In other words, unlike in traditional databases, the tables maintained by the data storage service (and the underlying storage system) may have no pre-defined schema other than their reliance on the primary key. Note that in some embodiments, if an attribute is included in an item, its value cannot be null or empty (e.g., attribute names and values cannot be empty strings), and, and within a single item, the names of its attributes may be unique. However, in at least some other embodiments, traditional database schemes may be employed, such as the various types of relational databases implemented using Server Query Language (SQL).

In various embodiments, the service (and/or the underlying system) may enforce pre-determined size limits on table names, items, attribute values, primary key values, and/or attribute names. For example, in some embodiments, the total size of all the attribute names and values in an item (i.e. the row size) may be limited. These attributes may also be described by system resource metadata and anomalies between these attributes and system resource metadata may be detected.

The database and data storage services described herein (and/or the underlying system) may provide an application programming interface (API) for requesting various operations targeting tables, items, and/or attributes maintained on behalf of storage service clients. In some embodiments, the service (and/or the underlying system) may provide both control plane APIs and data plane APIs. The control plane APIs provided by the data storage service (and/or the underlying system) may be used to manipulate table-level entities, such as tables and indexes and/or to re-configure various tables (e.g., in response to the findings presented in a skew report). These APIs may be called relatively infrequently (when compared to data plane APIs). In some embodiments, the control plane APIs provided by the service may be used to create tables, import tables, export tables, delete tables, explore tables (e.g., to generate various performance reports or skew reports), modify table configurations or operating parameter for tables (e.g., by modifying the amount of throughput capacity, adding storage capacity for additional read replicas, splitting partitions or moving partitions), and/or describe tables. In some embodiments, control plane APIs that perform updates to table-level entries may invoke asynchronous workflows to perform a requested operation. Methods that request "description" information (e.g., via a describeTables API) may simply return the current known state of the tables maintained by the service on behalf of a client/user. The data plane APIs provided by the data storage service (and/or the underlying system) may be used to perform item-level operations, such as storing, deleting, retrieving, and/or updating items and/or their attributes, or performing index-based search-type operations across multiple items in a table, such as queries and scans.

The APIs provided by the service described herein may support request and response parameters encoded in one or more industry-standard or proprietary data exchange formats, in different embodiments. For example, in various embodiments, requests and responses may adhere to a human-readable (e.g., text-based) data interchange standard, (e.g., JavaScript Object Notation, or JSON), or may be represented using a binary encoding (which, in some cases, may be more compact than a text-based representation). In various embodiments, the system may supply default values (e.g., system-wide, user-specific, or account-specific default values) for one or more of the input parameters of the APIs described herein.

As noted above, the control plane APIs supported by the service may include APIs that perform updates on tables (e.g., a CreateTable API and/or a DeleteTable API). In various embodiments, these APIs may invoke asynchronous workflows to perform the requested operation. In addition, the service may support methods that return the current known state (e.g., a DescribeTables API) or that return various skew metrics or reports (e.g., an ExploreTable API). In some embodiments, a common use model may be for a client to request an action (e.g., using a CreateTable API), and then to poll on its completion via the corresponding description API (e.g., DescribeTables). Other supported methods may be used to modify table configurations or parameters, e.g., an UpdateTable API (which may be used to increase the provisioned throughput capacity for a given table), a PurchaseTableCapacity API (which may be used to increase the provisioned storage capacity for a given table), a SplitTable API (which may be used to explicitly invoke an operation to split a table or any of its partitions), or a MoveTable API (which may be used to explicitly invoke an operation to move one or more tables, partitions of a table, or partition replicas of a table).

In some embodiments in which the system provides database or data storage services to clients, the system may provide an application programming interface (API) that includes support for some or all of the following operations on data maintained in a table by the service on behalf of a storage service client: put (or store) an item, get (or retrieve) one or more items having a specified primary key, delete an item, update the attributes in a single item, query for items using an index, and scan (e.g., list items) over the whole table, optionally filtering the items returned. For example, the data storage service (and/or underlying system) described herein may provide various data plane APIs for performing item-level operations, such as a PutItem API, a GetItem (or GetItems) API, a DeleteItem API, and/or an UpdateItem API, as well as one or more index-based seek/traversal operations across multiple items in a table, such as a Query API and/or a Scan API. Note that the amount of work required to satisfy service requests that specify these operations may vary depending on the particular operation specified and/or the amount of data that is accessed and/or transferred between the storage system and the client in order to satisfy the request.

Figure 6:
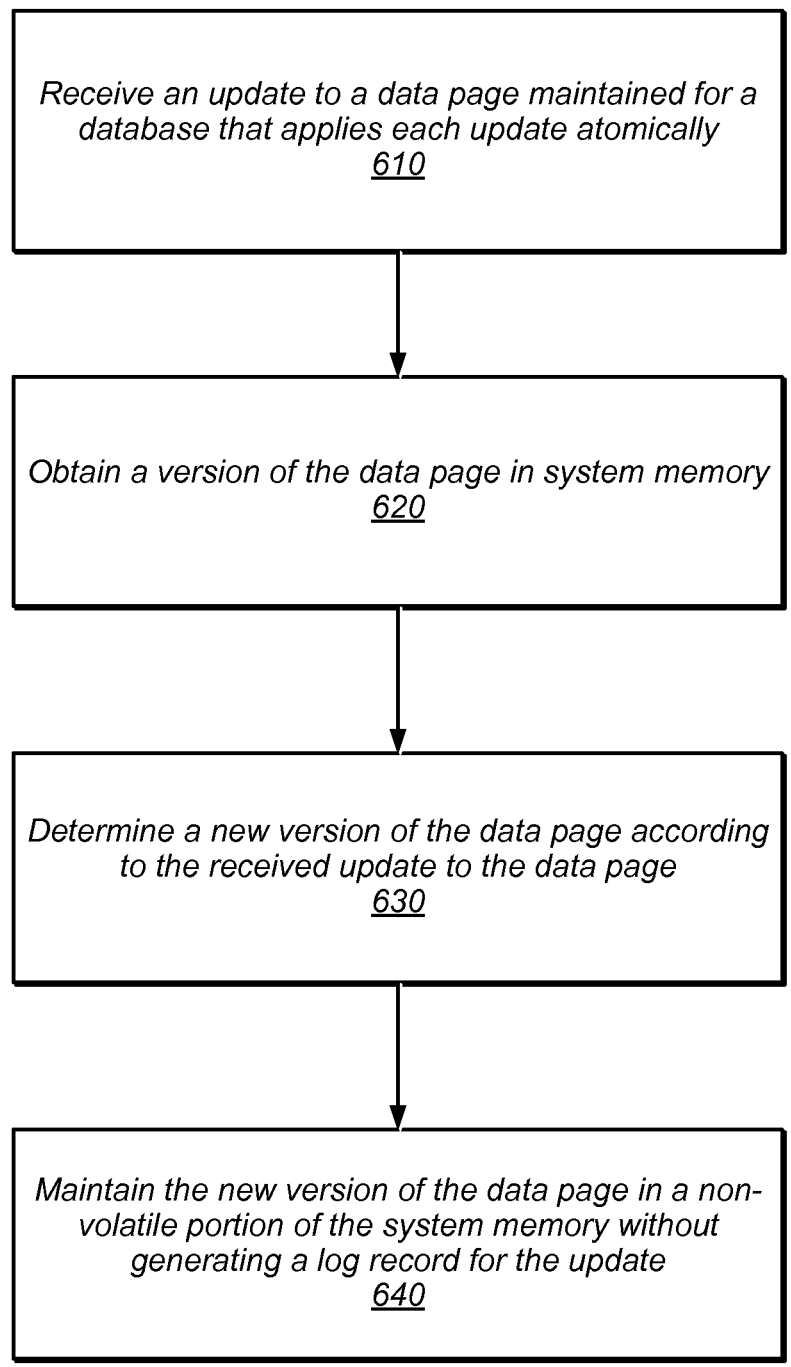
FIG. 6 is a high-level flowchart illustrating various methods for performing database system recovery using non-volatile system memory, according to some embodiments.

FIGS. 2-5 discussed above provided various examples of a database system implemented as a network-based storage service that may implement database system recovery using non-volatile system memory. Various other different database systems, whether distributed, network-based, or implemented on a single computing device may also implement database system recovery using non-volatile system memory. FIG. 6 is a high-level flowchart illustrating various methods for performing database system recovery using non-volatile system memory, according to some embodiments.

As indicated at 610, an update to a data page maintained for a database may be received, in various embodiments. In some embodiments, the database may perform each received update atomically. Although multiple steps or operations may be performed to perform the received update, from the perspective of a client or other system or device requesting the update, the update is either performed or not performed. Updates may be any form of change or modification to a data page resulting in a write operation to the data page.

In various embodiments, a version of the data page is obtained in system memory, as indicated at 620. As discussed above with regard to FIG. 5 and below with regard to FIG. 7, a data page to be updated may be maintained in one or more different locations. In some embodiments, for example, a data page may be maintained in a volatile portion of system memory and/or a non-volatile portion of system memory. A data page may also be maintained in a persistent storage device, such as a block storage device.

A new version of the data page may be determined according to the received update to the data page, as indicated at 630. In various embodiments, the new version of the data page may be calculated based on the received update, which may, for example, indicate a modification relative to a previous value (e.g., increase a value by 1). The various different API requests (e.g., put, delete, update) discussed above with regard to FIGS. 2-5, for instance, may indicate many different types of operations that update a data page. These updates, or many other different types of database operations that result in the update of a data page which are well-known to those of ordinary skill in the art may performed as indicated, and thus, the examples given above are not intended to be limiting.

The new version of the data page may be maintained, in various embodiments, in a non-volatile portion of the system memory, as indicated at 640. In at least some embodiments, the new version may be maintained without generating one or more log records for the update. In at least some embodiments, the new version of the data page may also be maintained in a volatile portion of the system memory (if the system memory includes a volatile portion). However, in at least some embodiments, versions of the data page maintained in the volatile portion of the system memory may be invalidated. As log records need not be generated when maintaining new versions of data pages, the database may, in various embodiments, recover from a database failure by making the non-volatile memory available to service read and write requests directed toward the database.

Figure 7:
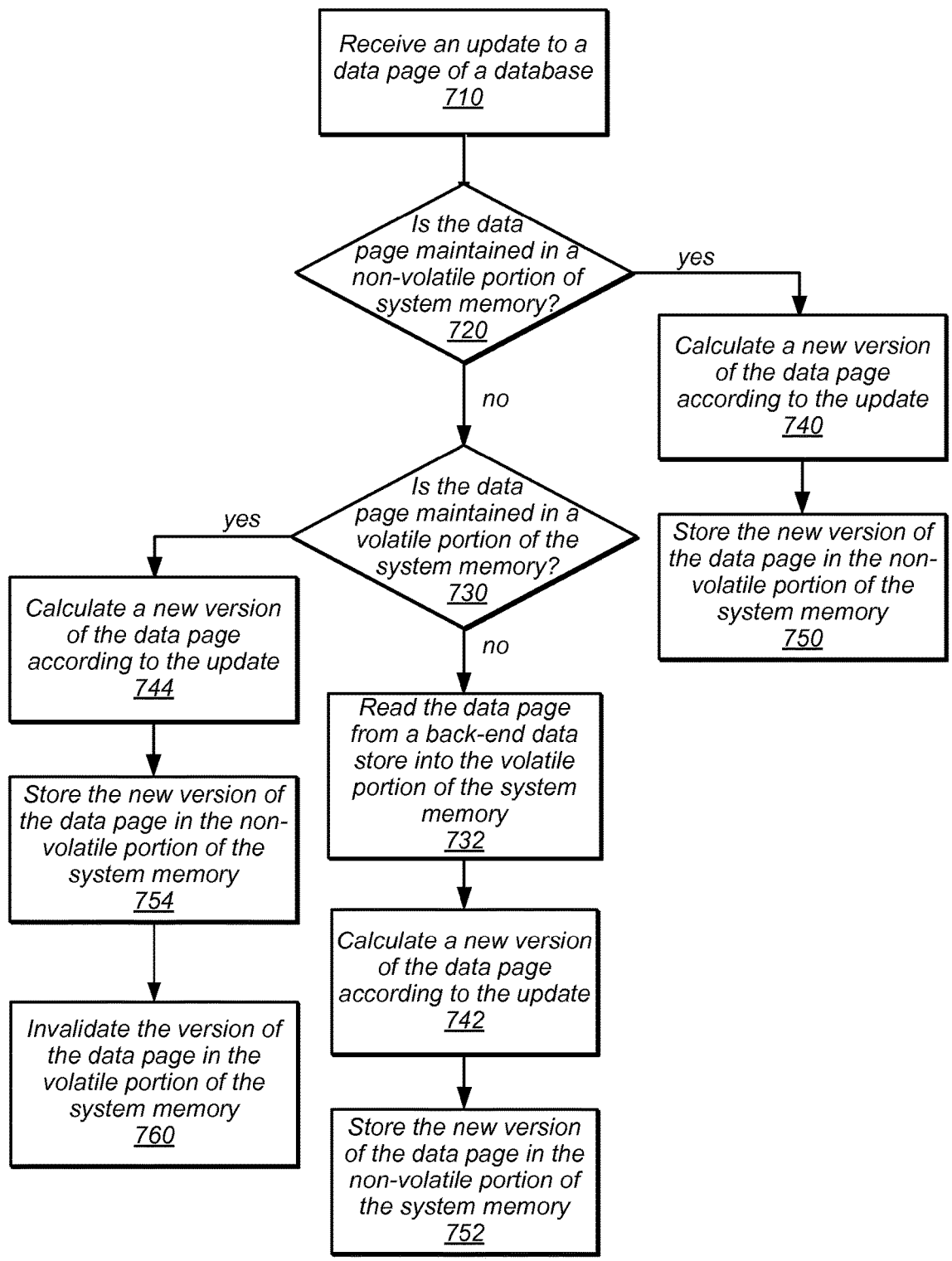
FIG. 7 is a high-level flowchart illustrating various methods for performing updates to a data page maintained for a database system implementing recovery using non-volatile system memory, according to some embodiments.

As data pages may be obtained and maintained in a variety of different locations, volatile memory, non-volatile memory, and persistent storage, performing updates for data pages may differ, in some embodiments, depending upon where the data page to be updated is maintained. FIG. 7 is a high-level flowchart illustrating various methods for performing updates to a data page maintained for a database system implementing recovery using non-volatile system memory, according to some embodiments. Please note, that FIG. 7 is provided as an example of some of the many different ways in which updates may be performed and maintained among non-volatile memory, persistent storage, and/or volatile memory.

As indicated at 710, an update to a data page of a database may be received. The location of the data page may be determined, in some embodiments. For example, at 720, it may be determined whether the data page is maintained in a non-volatile portion of system memory. If yes, then a new version of the data page may be calculated, according to the various techniques discussed above with regard to FIGS. 5 and 6, as indicated at 740. Then, the new version of the data page may be stored in the non-volatile portion of the system memory, as indicated at 750. Elements 720, 740, and 750, for example, may also be performed in embodiments where the entire system memory is non-volatile memory.

The location of the data page may also be determined with respect to a volatile portion of system memory, as indicated at 730. If yes, for example, the new version of the data page may be calculated, as indicated at 744, and stored in the non-volatile portion of the system memory, as indicated at 754. In some embodiments, the new version of the data page calculated at 744 may also be stored in the volatile portion of system memory, such as where the volatile portion of memory maintains a database cache for servicing read requests. Alternatively, in some embodiments, the version of the data page in the volatile portion of system memory may be invalidated, as indicated at 760. In this way, subsequent read requests for the data page may be serviced from the non-volatile portion instead of the volatile portion of system memory.

If the data page to be updated is not maintained in the non-volatile portion or the volatile portion of system memory, then, as indicated at 732, the data page may be read into system memory (e.g., into volatile system memory, or into non-volatile system memory). A new version of the data page may then be calculated according to the update, as indicated at 742, and then stored in the non-volatile portion of the system memory, as indicated at 750.

Figure 8:
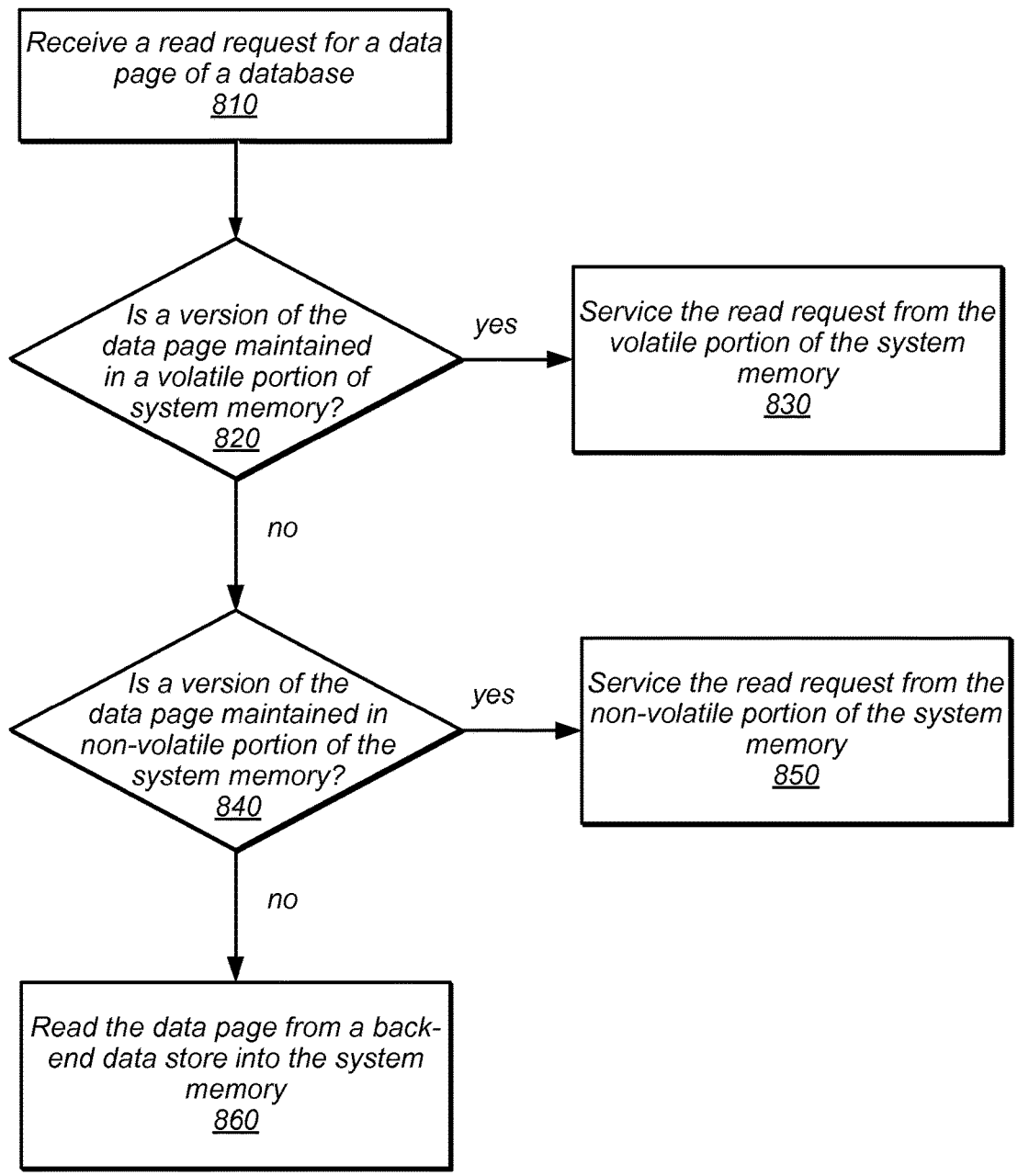
FIG. 8 is a high-level flowchart illustrating various methods for servicing a read request for a data page maintained for a database system implementing recovery using non-volatile system memory, according to some embodiments.

Similar to FIG. 7 discussed previously, the various different elements illustrated in FIG. 8 do not reflect all of the various ways for servicing read requests. Instead, FIG. 8 is a high-level flowchart illustrating some of the various methods for servicing a read request for a data page maintained for a database system implementing recovery using non-volatile system memory. As indicated at 810, a read request for a data page of a database may be received. In various embodiments the location of the data page may be determined. For example, as illustrated at 820, it may be determined whether the data page is maintained in a volatile portion of system memory. If yes, then the read request may be serviced from the volatile portion of system memory, as indicated at 830. Although not illustrated, in some embodiments, it may also be determined whether a version of the data page maintained in the volatile portion of the database is valid, such as by examining metadata describing data pages maintained in the volatile portion of the system memory (e.g., whether or not a dirty bit is set in the version of the data page).

Similarly, as indicated at 840, it may also be determined whether the data page is maintained in a non-volatile portion of the system memory. If so, then the read request may be serviced from the non-volatile portion of the system memory, as indicated at 850. Although not illustrated, in some embodiments, a copy of the version of the data page in the non-volatile portion of the system memory may be written to the volatile portion of the system memory in order to service subsequent read requests. For example, the volatile portion of system memory may respond to read requests more quickly than the non-volatile portion of system memory. Alternatively, if the data page is not to be found in either the volatile or non-volatile portions of system memory, the data page may be read into system memory from a back-end data store maintaining data pages for the database, as indicated at 860.

Figure 9:
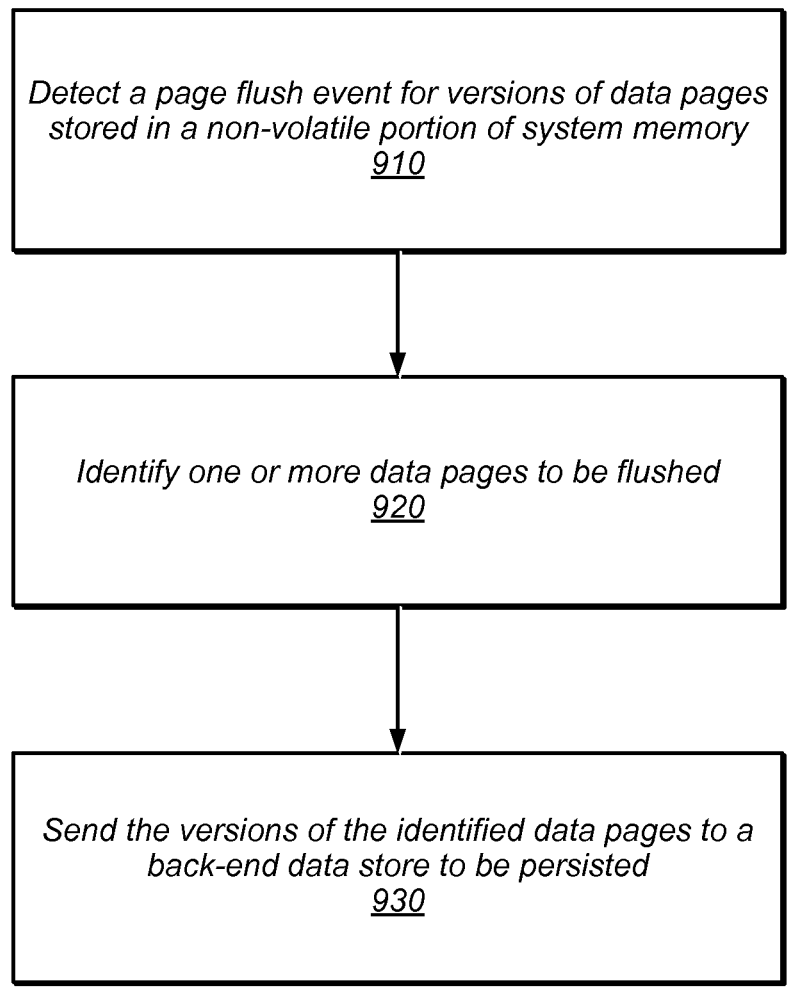
FIG. 9 is a high-level flowchart illustrating various methods for storing new versions of data pages maintained in non-volatile system memory, according to some embodiments.

FIG. 9 is a high-level flowchart illustrating various methods for storing new versions of data pages maintained in non-volatile system memory, according to some embodiments. As indicated at 910, a page flush event may be detected for versions of data pages stored in a non-volatile portion of system memory, in various embodiments. A page flush event may be detected in a variety of different ways. In some embodiments, a page flush event may be a database checkpoint. A database checkpoint may be triggered at periodic intervals (e.g., every 5 minutes) in order to ensure that the amount of data maintained in the non-volatile portion of the system memory does not grow large. A page flush event may be detected upon recovery from a database system failure. A page flush event may also be detected when the amount of available storage space in the non-volatile portion of the system memory falls below an available storage threshold (e.g., a certain number of pages maintained, a certain amount of available space remaining) A flush event may also occur when ever system resources for flushing data pages to persistent storage are available (i.e., whenever resources are sufficient to perform background processing). For example, in some embodiments, a page flush event may be triggered when foreground processing, such as responding to read requests and/or updates to data pages, is below a certain resource utilization threshold.

As indicated at 920, in various embodiments one or more data pages may be identified to be flushed. For example, in some embodiments an algorithm, such as least recently used (LRU) or other technique for identifying those data pages less likely to be accessed, may be implemented to determine the data pages to flush. In some embodiments, all data pages may be flushed in response to detecting a flush event. For those identified data pages, the versions of the data pages maintained in the non-volatile portion of the system memory are sent to a back-end data store to be persisted, as indicated at 930.

FIGS. 6 through 9 are provided in order to illustrate some of the various methods and techniques for implementing database system recovery using non-volatile system memory. The order of methods may be changed, and various elements may be added, reordered, combined, omitted, modified, etc., and as such, FIGS. 6 through 9, are not intended to be limiting as to those modifications and changes that may be made as would be obvious to a person skilled in the art having the benefit of this disclosure. The methods may be implemented in software, hardware, or a combination thereof.

Embodiments of performing database system recovery using non-volatile system memory as described herein may be executed on one or more computer systems, which may interact with various other devices. One such computer system is illustrated by FIG. 10. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device, keyboard, and display(s). Display(s) may include standard computer monitor(s) and/or other display systems, technologies or devices. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions 1025 and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

Figure 10:
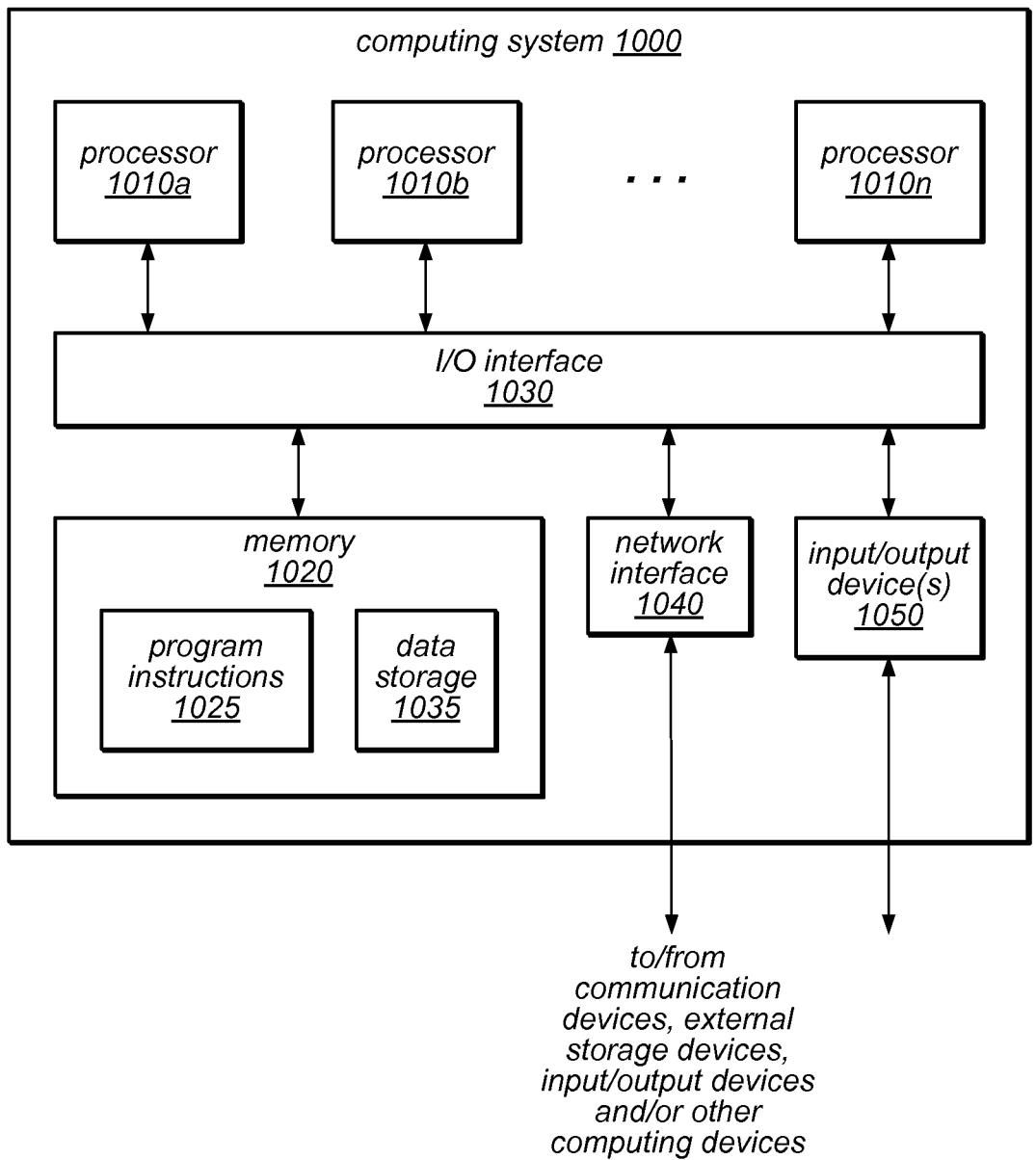
FIG. 10 is a block diagram of a computing system configured to implement the various methods and techniques described herein, according to some embodiments.

As shown in FIG. 10, memory 1020 may include program instructions 1025, configured to implement the various embodiments of database system recovery using non-volatile system memory as described herein, and data store 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 1000 may be transmitted to computer system 1000 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A database system, comprising:
   database storage, configured to maintain a plurality of data pages for a database on one or more block-based storage devices;
   system memory, wherein at least a portion of the system memory is a non-volatile portion comprising non-volatile memory, wherein the non-volatile memory is configured to preserve data maintained in the non-volatile portion of the system memory irrespective of a system failure;
   a database engine, wherein said database engine atomically applies each received update to the database and is configured to:
   receive an update to a data page of the plurality of data pages maintained for the database;
   read a version of the data page from the database storage into the system memory of the database system;
   determine a new version of the data page that was previously read from the database storage into the system memory of the database system according to the received update to the data page;
   store in the non-volatile portion of the system memory of the database system the new version of the data page that was previously read from the database storage into the system memory of the database system; and
   flush from the non-volatile portion of the system memory of the database system to the database storage the new version of the data page that was previously read from the database storage into the system memory of the database system;
   wherein said determining, said storing, and said flushing are performed without writing a log for the update.

2. The system of claim 1,
   wherein at least another portion of the system memory is a volatile portion of the system memory comprising volatile memory;
   wherein the database engine is further configured to:
   receive an update to another data page of the plurality of data pages;
   read the other data page in order to obtain the version of the other data page from the database storage into the volatile portion of the system memory;
   determine a new version of the other data page according to the received update to the other data page;
   store the new version of the other data page in the non-volatile portion of the system memory; and
   in response to storing the new version of the other data page in the non-volatile portion of the system memory, invalidate the version of the other data page in the volatile portion of the system memory.

3. The system of claim 2, wherein the database engine is further configured to:
   receive a read request for the other data page; and
   read the new version of the data page from the non-volatile system memory in order service the other read request for the database page.

4. The system of claim 1, wherein the database storage, the system memory, and the database engine are implemented together on a node of a plurality of nodes implementing a distributed database service, wherein the distributed database service maintains one or more databases including the database for one or more clients, and wherein the update to the data page is received from one of the one or more clients.

5. A method, comprising:
   performing, by one or more computing devices:
   receiving an update to a data page maintained for a database, wherein the data page is one of a plurality of data pages stored for the database at a back-end data store, wherein each update received at the database is applied atomically;
   obtaining, in system memory of the one or more computing devices, a version of the data page from the back-end data store;
   determining a new version of the data page that was previously obtained from the back-end data store according to the received update to the data page; and
   maintaining in a non-volatile portion of the system memory of the one or more computing devices the new version of the data page that was previously obtained from the back-end data store, wherein the non-volatile portion of the system memory of the one or more computing devices preserves data maintained in the non-volatile portion irrespective of a system failure.

6. The method of claim 5, wherein said determining the new version of the data page according to the received update to the data page is performed without generating any log records that indicate the update applied to the version of the data page for a log-based recovery process.

7. The method of claim 5, wherein said obtaining the version of the data page comprises reading the version of the data page from a volatile portion of the system memory.

8. The method of claim 7, wherein read performance of the volatile portion of the system memory is faster than read performance of the non-volatile portion of the system memory.

9. The method of claim 5, further comprising:
receiving a read request for another data page of the plurality of data pages stored for the database at the back-end data store;
reading a version of the other data page from the back-end data store into the non-volatile portion of the system memory in order to service the read request for the other data page.

10. The method of claim 5, wherein the non-volatile portion of the system memory maintains new versions of one or more other data pages of the plurality of data pages, and wherein the method further comprises:
identifying at least one of the new versions of the one or more other data pages to be flushed to the back-end data store; and
sending the identified at least one new version of the one or more other data pages to the back-end data store to be persisted as a current version of the data page.

11. The method of claim 10, wherein said receiving, said obtaining, said applying, and said storing are a performed as part of a foreground process, and wherein said identifying and said sending are performed as part of a background process.

12. The method of claim 5, wherein the one or more computing devices together implement a node of a plurality of nodes implementing a multi-tenant, network-based, database service, wherein the database service maintains one or more databases including the database for one or more clients, and wherein the update to the data page is received from one of the one or more clients of the database service.

13. A non-transitory, computer-readable storage medium, storing program instructions that when executed by one or more computing devices implement a storage engine that implements:
receiving an update to a data page maintained for a database, wherein the data page is one of a plurality of data pages persistently stored for the database at one or more block-based storage devices, wherein each update received at the database is applied atomically;
obtaining, in system memory of the one or more computing devices, a version of the data page from the one or more block-based storage devices;
calculating a new version of the data page previously obtained from the one or more block-based storage devices according to the received update to the data page; and
storing into a non-volatile portion of the system memory of the one or more computing devices the new version of the data page previously obtained from the one or more block-based storage devices, wherein the non-volatile portion of the system memory of the one or more computing devices preserves data maintained in the non-volatile portion irrespective of a system failure.

14. The non-transitory, computer-readable storage medium of claim 13, wherein in said obtaining the version of the data page, the storage engine implements reading the version of the data page from the one or more block-based storage devices.

15. The non-transitory, computer-readable storage medium of claim 13, wherein in said obtaining the version of the data page, the storage engine implements reading the version of the data page from a volatile portion of the system memory.

16. The non-transitory, computer-readable storage medium of claim 15, wherein the update to the data page is one of a plurality of received updates to one or more other data pages of the plurality of data pages, and wherein the storage engine further implements:
upon completing said obtaining, said calculating, and said storing for all of the one or more other data pages and the data page, invalidating respective versions of the one or more other data pages and the data page maintained in the volatile portion of the system memory.

17. The non-transitory, computer-readable storage medium of claim 13, wherein a volatile portion of the system memory maintains versions of one or more data pages of the plurality of data pages, and wherein the storage engine further implements:
determining that a number of read requests received for a particular one of the one or more data pages maintained at the volatile portion of the system memory exceeds a hot page threshold;
in response to determining that the number of read requests received for the particular one of the one or more data pages maintained at the volatile memory exceeds the hot page threshold:
storing a copy of the version of the particular one data page in the non-volatile portion of the system memory.

18. The non-transitory, computer-readable storage medium of claim 13, wherein a volatile portion of the system memory maintains versions of one or more data pages of the plurality of data pages, and wherein the storage engine further implements:
storing one or more indicators of the versions of one or more data pages of the plurality of data pages in the non-volatile portion of the system memory.

19. The non-transitory, computer-readable storage medium of claim 13, wherein the non-volatile portion of system memory maintains new versions of one or more other data pages of the plurality of data pages, and wherein the storage engine further implements:
detecting a page flush event;
in response to detecting the page flush event:
identifying at least one of the new versions of the one or more other data pages to be flushed to the one or more block storage devices; and
sending the identified at least one new version of the one or more other data pages to the one or more block storage devices to be persisted.

20. The non-transitory, computer-readable storage medium of claim 18, wherein, in said detecting the page flush event the storage engine implements determining that available storage space in the non-volatile portion of the system memory is below an available storage space threshold.

21. The non-transitory, computer-readable storage medium of claim 13, wherein the non-volatile portion of system memory maintains new versions of one or more other data pages of the plurality of data pages, and wherein the database engine further implements:
upon recovery from a system failure, making the new versions of the one or more other data pages and the data page of the plurality of data pages in the non-volatile portion of the system memory available for servicing access requests without applying one or more log records to the one or more other data pages and the data page.

* * * * *